United States Patent
Groulard et al.

(10) Patent No.: US 10,711,352 B2
(45) Date of Patent: Jul. 14, 2020

(54) PRODUCTS FOR THE PREVENTIVE TREATMENT OF STAINLESS STEEL AND RELATED METHODS

(71) Applicant: TECHNOCHIM SA, Ghislenghien (BE)

(72) Inventors: Frédéric Groulard, Cambron-Saint-Vincent (BE); François Tosar, Gosselies (BE)

(73) Assignee: TECHNOCHIM SA, Ghislenghien (BE)

( * ) Notice: Subject to any disclaimer, the term of this patent is extended or adjusted under 35 U.S.C. 154(b) by 32 days.

(21) Appl. No.: 15/428,270

(22) Filed: Feb. 9, 2017

(65) Prior Publication Data

US 2017/0342570 A1 Nov. 30, 2017

(30) Foreign Application Priority Data

May 24, 2016 (EP) .................................... 16171071

(51) Int. Cl.
| | | |
|---|---|---|
| *C11D 7/10* | (2006.01) | |
| *C11D 7/26* | (2006.01) | |
| *C23F 11/04* | (2006.01) | |
| *C23G 1/08* | (2006.01) | |
| *C23C 22/46* | (2006.01) | |
| *C11D 3/20* | (2006.01) | |
| *B08B 3/04* | (2006.01) | |
| *C11D 3/04* | (2006.01) | |
| *C02F 5/10* | (2006.01) | |

(52) U.S. Cl.
CPC .............. *C23F 11/04* (2013.01); *B08B 3/041* (2013.01); *C11D 3/046* (2013.01); *C11D 3/2075* (2013.01); *C11D 3/2079* (2013.01); *C11D 3/2086* (2013.01); *C23C 22/46* (2013.01); *C23G 1/088* (2013.01); *C02F 5/10* (2013.01); *C02F 2303/08* (2013.01)

(58) Field of Classification Search
CPC ..... C11D 3/046; C11D 3/2075; C11D 3/2079; C11D 3/2086; B08B 3/041

USPC ..... 510/245, 254, 477, 488, 508; 134/34, 41
See application file for complete search history.

(56) References Cited

U.S. PATENT DOCUMENTS

| | | | |
|---|---|---|---|
| 2,793,190 A | | 5/1957 | Streicher |
| 3,649,371 A | | 3/1972 | Tongyai |
| 4,032,466 A | * | 6/1977 | Otrhalek .................. C11D 1/83 134/13 |
| 4,116,713 A | * | 9/1978 | Otrhalek .................. C11D 1/83 134/13 |
| 4,828,743 A | | 5/1989 | Rahfield et al. |
| 4,980,076 A | * | 12/1990 | Tanaka .................. C23G 1/125 134/3 |
| 2010/0078040 A1 | | 1/2010 | Vernier |
| 2011/0309296 A1 | | 12/2011 | Boehme et al. |

FOREIGN PATENT DOCUMENTS

| | | |
|---|---|---|
| EP | 1 721 961 A1 | 11/2006 |
| GB | 2 064 852 A | 6/1981 |

OTHER PUBLICATIONS

Lee S O et al., entitled "Dissolution of iron oxide using oxalic acid," Hydrometallurgy, vol. 87, No. 3-4, 2007, pp. 91-99.
Cornell R M et al., entitled "Photochemical Dissolution of Goethite in Acid/Oxalate Solution," Clays and Clay Minerals, vol. 35, No. 5, 1987, pp. 347-352.
Lee S O et al., entitled "Study on the kinetics of iron oxide leaching by oxalic acid," International Journal of Mineral Processing, vol. 80, No. 2-4, 2006, pp. 144-152.

* cited by examiner

*Primary Examiner* — Gregory R Delcotto
(74) *Attorney, Agent, or Firm* — Amster, Rothstein & Ebenstein LLP

(57) ABSTRACT

Provided herein is a reductive solution for preventing rouge formation on stainless steel, said solution comprising complexing anions, $Fe^{2+}$, and, optionally, one or more pH modifiers. Further provided are methods for manufacturing said solution, methods for prevention of rouge formation on stainless steel surfaces, and related uses of the aforementioned reductive solution.

16 Claims, No Drawings

PRODUCTS FOR THE PREVENTIVE TREATMENT OF STAINLESS STEEL AND RELATED METHODS

CROSS REFERENCE TO RELATED APPLICATION

This application claims priority to European Patent Application No. 16171071.0, filed on May 24, 2016, the contents of which are hereby incorporated by reference.

FIELD OF THE INVENTION

Provided herein is a reductive solution for preventing rouge formation on stainless steel, said solution comprising complexing anions, $Fe^{2+}$, and, optionally, one or more pH modifiers. Further provided are methods for manufacturing said solution, methods for prevention of rouge formation on stainless steel surfaces, and related uses of the aforementioned reductive solution.

BACKGROUND

Various iron alloys have been prepared through the ages. One of the most common iron alloys is steel, which generally comprises 0.2 to 2.1% wt (percent by total weight) of carbon in addition to iron. Carbon is added as a hardening agent, i.e. its addition renders steel harder than iron.

Iron and steel tend to oxidize under many practical conditions, thereby forming iron or iron-chromium oxides. Oxidation of iron or steel work pieces is often undesirable because of the resulting degradation of mechanical properties, and because of a degraded visual appearance.

In order to reduce the susceptibility of iron alloys to corrosion, further elements are commonly introduced to the alloys. One variety of iron alloys is stainless steel which comprises at least 10.5% chromium by weight. This chromium content corresponds to the minimum amount required to form a passive layer on the steel surface under atmospheric conditions. In addition to chromium, further elements frequently found in stainless steels are Ni and Mo. Their purpose is to further improve corrosion resistance.

Stainless steels are characterized by a very thin and stable surface layer called a passive layer. The passive layer is rich in chromium oxide and generally has a thickness of 1 to 5 nm. It consists of approximately 70% wt chromium oxide and 30% wt iron oxide. Chromium oxide is thermodynamically stable and chemically inert under atmospheric conditions, and the chromium oxide rich passive layer is non-permeable for most oxidizing agents which might initiate corrosion. However, corrosion of this passive layer occurs nevertheless under specific conditions which commonly occur in the pharmaceutical industry. In particular, it is frequently observed in the pharmaceutical industry that stainless steel surfaces tend to develop a red to black thick surface layer (rouging) upon contact with hot (above 50° C.) water (vapour or liquid) having a conductivity less than 1 $\mu S/cm^2$. For instance, the surfaces of Water-For-Injection equipment inspected after 6 to 18 months often show the so-called rouging effects, i.e. the presence of an increased concentration of iron oxide on the surface. Apart from iron oxide, mixed metal oxides are also present such as iron-chrome-nickel mixed metal oxides.

The cause of rouging is not well known yet. Rouging presents a danger in the pharmaceutical industry since it leads to the release of heavy metal oxide particles from the stainless steel surface. This entails the danger of undesired contamination of pharmaceuticals with heavy metal particles, and therefore rouging negatively affects the purity and quality of produced and/or processed products. Furthermore, rouging increases the micro-roughness of affected stainless steel surfaces.

Because of the deleterious effects of rouging, great efforts have been directed to rouging removal. For example, WO2009095475 describes a method for the treatment of thick oxidic iron layers (rouging) on stainless steel (AISI 316L) surfaces. The method makes use of a reductive solution consisting of a freshly prepared 0.25% solution of solid sodium dithionite in water which additionally comprises 0.5% 2-phosphonobutane-1,2,4-tricarboxylic acid sodium salt (PBC-Na4), 0.25% tetrasodiumiminodisuccinate, 0.05% potassium oxalate, and 0.1% of sodium hydrogen carbonate/carbonic acid buffer. The use of this reductive solution by contacting the oxidized stainless steel surface with it is claimed to completely remove the rouging from the stainless steel surface. A presentation from the inventor of WO2009095475 (rouging and derouging of stainless steel, Marc Vernier, USA, October 2009, retrieved from the website www.ultracleanep.com) clearly shows that the aspect of the stainless steel obtained after derouging often still presents a black veil. Furthermore, the use of sodium dithionite is restricted to oxygen-free conditions since sodium dithionite oxidizes easily. As a result, the cleaning needs to be performed under an inert atmosphere which is not convenient. In addition, the aforementioned method merely provides a curative treatment for rouging. It would be more desirable to prevent rouging altogether.

SUMMARY OF THE INVENTION

The above objectives are accomplished by methods according to the present invention. That is, the present invention relates to stainless steel treatments to prevent rouging, their uses, to related products, and to methods for manufacturing those products.

Accordingly, provided herein are reductive solutions and related methods and uses according to the appended claims. Furthermore:

In one aspect, provided herein is a reductive solution for preventing rouge formation on stainless steel, said solution comprising:
from $5.0 \times 10^{-3}$ to $1.0 \times 10^{-1}$ mol/l, preferably from $1.0 \times 10^{-2}$ to $5 \times 10^{-2}$ mol/l, more preferably $2.0 \times 10^{-2}$ mol/l of one or more complexing anions;
from $1.35 \times 10^{-5}$ to $9.0 \times 10^{-5}$ mol/l of $Fe^{2+}$, preferably $5.0 \times 10^{-5}$ mol/l of $Fe^{2+}$, and,
optionally, one or more pH modifiers
wherein the reductive solution has a pH from at least 0.0 to at most 6.0.

In some embodiments, said one or more complexing anions comprise oxalate.

In some embodiments, the reductive solution has a pH from 2.0 to 4.5, preferably from 2 to 4, more preferably from 2.6 to 3.2, most preferably from 2.8 to 3.2, even more preferably from 2.8 to 3.0.

In some embodiments, the one or more pH modifiers are one or more bases, the one or more bases preferably selected from the list comprising $NH_3$ and $NH_4OH$.

In some embodiments, the reductive solution does not comprise citric acid.

In a further aspect, disclosed herein is a method for manufacturing a reductive solution provided herein, the method comprising the step of:

mixing water, a complexing acid and/or salts thereof, a water-soluble ferrous salt, and optionally one or more pH modifiers.

In some embodiments, the complexing acid and/or salts thereof comprise oxalic acid and/or salts thereof.

In a further aspect, disclosed herein is a process for preventing rouge formation on stainless steel substrates, comprising the step of: contacting the stainless steel substrate with a reductive solution provided herein.

In some embodiments, the reductive solution and/or the substrate has a temperature of 50 to 95° C., preferably of 70 to 90° C., and more preferably from 80 to 90° C. during contacting.

In some embodiments, the contact time of the substrate with the reductive solution is from 0.50 hours to 8 hours, preferably from 0.50 hour to 4 hours, preferably from 0.50 hours to 2 hours, more preferably from 0.75 hours to 1.5 hours.

Preferably, the method comprises the step of contacting the stainless steel substrate with the reductive solution on a recurring basis; the frequency of contacting preferably being between one contacting step per process cycle and one contacting step every 20 process cycles, more preferably the frequency of contacting being between one contacting step every five process cycles and one contacting step every ten process cycles.

In some embodiments, the stainless steel substrate is exposed to an aqueous fluid having a conductivity less than 1 $\mu S/cm^2$ between the successive contacting events. In some embodiments, contacting is performed by dipping, flushing, or spraying.

In a further aspect, provided herein is the use of a reductive solution provided herein for the removal of rouge on stainless steel surfaces.

DETAILED DESCRIPTION

The present invention will be described with respect to particular embodiments but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

As used herein, and unless provided otherwise, the term "substrate" referred to in the different aspects of the present invention is an iron or iron alloy substrate. Preferably it is a stainless steel substrate. For instance, it is a CrNi or a CrNiMo steel. Examples of CrNi and CrNiMo steels are steels of grades AISI 304 (1.4301), AISI 304L (1.4307, 1.4306), AISI 316 (1.4401), AISI 316L (1.4404, 1.4435), AISI316Ti (1.4571), or AISI 904L (1.4539) [*1.xxxx=according to DIN 10027-2].

As used herein and unless stated otherwise, the term "metal oxide" refers to iron (II) and/or iron (III) oxides and/or hydroxides, rouge (such as class I rouge, class II rouge, or class III rouge), and/or spinels such as iron (II-III) oxides wherein optionally part of the iron atoms are replaced by chromium, nickel, molybdenum and/or silicon atoms.

Some aspects of the present invention relate to a new reductive solution and its use, and to a method using said new reductive solution, preferably for the treatment of stainless steel surfaces for preventing rouging. Examples of stainless steel substrates that can be cleaned according to aspects of the present invention are mixing vats, storage containers, fermenters, recipient vessels, dryers, filling machines, sterilization vessels, freeze dryers, autoclaves, washing machines, ultrapure water generators, ultrapure vapor generators, distribution lines for purified or ultrapure fluids, amongst others.

Rouging corresponds to the formation of a metal oxide layer on stainless steel surfaces which may result from elaborate contact of a substrate with an ultraclean aqueous fluid. This holds specifically true at high temperatures (e.g.

above 50° C.). The metal oxides may comprise iron oxides and/or hydroxides with some iron atoms substituted by either chromium or nickel. As explained above, rouging is disadvantageous for a variety of reasons. Accordingly, avoiding rouging is desirable.

In one aspect, provided herein is a reductive solution for preventing rouge formation on stainless steel. The solution typically comprises one or more complexing ions and $Fe^{2+}$.

Preferably, the solution comprises
from $5.0\times10^{-3}$ to $1.0\times10^{-1}$ mol/l, of one or more complexing anions;
from $1.35\times10^{-5}$ to $9.0\times10^{-5}$ mol/l of $Fe^{2+}$.

Preferably, the reductive solution is an aqueous solution.

Preferably, the reductive solution comprises the one or more complexing anions in a concentration of $1.0\times10^{-2}$ to $5\times10^{-2}$ mol/l. More preferably, the reductive solution comprises the one or more complexing anions in a concentration of $2.0\times10^{-2}$ mol/l.

Preferably, the reductive solution comprises $5.0\times10^{-5}$ mol/l of $Fe^{2+}$.

Optionally, the reductive solution comprises one or more pH modifiers.

In some embodiments, the complexing anions are anions corresponding to the conjugate bases of organic poly-carboxilic acids. Preferably, the organic poly-carboxilic acids are selected from dicarboxylic acids and tricarboxylic acids (e.g. oxalic acid, citric acid, tartaric acid, maleic acid, fumaric acid, adipic acid, succinic acid, and mixtures thereof). Preferably, the one or more complexing anions comprise oxalate. In an embodiment, the reductive solution comprises oxalate and does not comprise citrate and/or ascorbate.

In some embodiments, the complexing anion is added as a salt. In some embodiments, the complexing anion is added as an acid.

In some embodiments, when the complexing anion is added as a salt, the counter-ion is preferably ammonium. In some embodiments, the complexing anion is added as ammonium oxalate.

Such reductive solutions are highly effective for preventing rouge formation on stainless steel surfaces.

In some embodiments, the one or more complexing acids comprise oxalic acid. This can improve the efficiency of rouge prevention by means of the reductive solution provided herein. In particular, oxalic acid has many advantages. One of its advantages is its low cost. Furthermore, oxalic acid is relatively non-toxic, and has a relatively low impact on the environment. In addition, oxalic acid is highly effective for use in preventive rouge treatments, and oxalic acid can be easily dissolved in water.

In some embodiments, the reductive solution has a pH from 0 to 6.0, preferably 0 to 5.5, preferably 0 to 5.0, preferably 0 to 4.5, more preferably 1.0 to 6.0, more, preferably 1.0 to 5.5, more preferably 1.0 to 5.0, more preferably 1.0 to 4.5, even more preferably 2.0 to 6.0, more preferably from 2.0 to 5.5, more preferably from 2.0 to 5.0, more preferably from 2.0 to 4.5, more preferably from 2 to 4, more preferably from 2.8 to 3.0. This can improve the efficiency of rouge prevention by means of the reductive solution provided herein.

In some embodiments, when the reductive solution does not comprise a pH modifier, the pH of the reductive solution is about 1.7. Preferably, the reductive solution comprises an amount of pH modifier which is adapted to bring the reductive solution to a pH between 2.0 to 6.0, more preferably between 2.0 to 4.0, even more preferably between 2.5 to 3.5, most preferably between 2.8 and 3.0. This enhances the effectiveness of the preventive treatment.

In some embodiments, said one or more pH modifiers are one or more bases, the one or more bases preferably selected from the list comprising $NH_3$ and $NH_4OH$. This can improve the efficiency of rouge prevention by means of the reductive solution provided herein.

In some embodiments, the reductive solution does not comprise citric acid. This can improve the efficiency of rouge prevention by means of the reductive solution provided herein.

In a further aspect, the present disclosure relates to a method for manufacturing a reductive solution provided herein. The method comprises the step of: mixing water, a complexing acid and/or salts thereof, a water-soluble ferrous salt, and optionally one or more pH modifiers. Accordingly, a reductive solution provided herein is obtained in an efficient way.

Rouge formation on stainless steel surfaces can be effectively avoided by means of solutions manufactured by this method.

Preferably, the method comprises the step of: mixing water, oxalic acid and/or salts thereof, a water-soluble ferrous salt, and one or more pH modifiers. Accordingly, a solution provided herein is readily obtained.

In some embodiments, $Fe^{2+}$ is introduced in the solution via an inorganic or an organic Fe(II) source, the iron source being soluble in water.

Examples of inorganic iron salts that can be used as an Fe(II) source are ammonium iron (II)-sulphate-6-hydrate, iron (II) sulphate, iron (II) chloride, iron (II) fluoride, and iron (II) tetrafluoroborate, amongst others.

Examples of organic compounds that can be used as an Fe(II) source are iron (II) acetate, iron(II) gluconate, iron (II) methoxide, and iron (II) oxalate, amongst others.

Once the various components of the solution listed above are mixed together, the pH of the solution may be below the target pH. In order to bring the pH at its target value, one or more pH modifiers can be added to the solution. These one or more pH modifiers may be bases. For instance, ammonia ($NH_3$) or $NH_4OH$ can be used.

In a further aspect, provided herein is a process for preventing rouge formation on stainless steel substrates, comprising the step of: contacting the stainless steel substrate with a reductive solution provided herein.

Accordingly, rouge formation on stainless steel surfaces can be prevented very effectively. In particular, such a process has the advantage that the preventive treatment can be executed in the presence of atmospheric oxygen.

In particular embodiments, the above contacting step is executed after a certain time of processing, the processing involving contacting stainless steel with an aqueous fluid having a conductivity of less than 1 $\mu S/cm^2$, for example at a temperature of 50° C. A certain time may be, for example, 1, 2, 3, 4, or more days. After the preventive treatment, processing may continue again for a certain time, for example for 1, 2, 3, 4, or more days, until the preventive treatment provided herein is repeated. The alternation of processing and preventive treatment provided herein may be repeated numerous times.

Generally, the process is repeated after a pre-determined amount of process cycles, rather than after a pre-determined amount of time.

Accordingly, in some embodiments, the process comprises the step of contacting the stainless steel substrate with the reductive solution on a recurring basis; the frequency of contacting preferably being between one contacting step per process cycle and one contacting step every 20 process cycles, more preferably the frequency of contacting being between one contacting step every five process cycles and one contacting step every ten process cycles.

In some embodiments, the process further comprises the step of contacting the stainless steel substrate with an aqueous detergent solution after every process cycle.

Preferably, the process comprises the steps of rinsing the stainless steel substrate after every process cycle. Preferably, the rinsing steps involve rinsing the stainless steel substrate with an aqueous solution. Preferably, the aqueous solution is an aqueous detergent solution.

In some embodiments, the reductive solution and/or the substrate has a temperature of 50 to 95° C., preferably of 70 to 90° C., and more preferably from 80 to 90° C. during contacting. Preferably, both the reductive solution and the substrate have a temperature of 50 to 95° C., more preferably of 70 to 90° C., and even more preferably from 80 to 90° C. during contacting. Accordingly, rouging of stainless steel surfaces can be prevented very efficiently. These temperatures allow for effective preventive treatments to counter rouging. The preferred ranges correspond to process conditions yielding more effective and faster treatments.

In some embodiments, the contact time of the substrate with the reductive solution is from 0.50 hours to 8 hours, preferably from 0.50 hour to 4 hours, preferably from 0.50 hours to 2 hours, more preferably from 0.75 hours to 1.5 hours. The contact time is the time during which the reductive solution provided herein and the substrate are in contact during a single preventive treatment. Accordingly, rouging of stainless steel surfaces can be prevented very efficiently.

In some embodiments, the stainless steel substrate is exposed to an aqueous fluid having a conductivity less than 1 μS/cm² in between the successive contacting events.

Such exposure may cause rouging on stainless steel surfaces. Contacting the stainless steel surface with solutions provided herein is effective to prevent rouge formation.

In some embodiments, contacting is performed by dipping, flushing, or spraying. These are highly effective ways of contacting.

In a further aspect, provided herein is the use of a solution provided herein for the prevention of rouge formation on stainless steel surfaces. This allows very efficient prevention of rouge formation on stainless steel surfaces.

EXAMPLES

Example 1

In a first example, an exemplary reductive solution is provided. The reductive solution is an aqueous solution comprising oxalate ions in a concentration of $2.0 \times 10^{-2}$ mol/l, $Fe^{2+}$ ions in a concentration of $5.0 \times 10^{-5}$ mol/l, and a quantity of $NH_4OH$ adapted to bring the pH of the reductive solution to 2.9.

Example 2

In a further example, a process for preventive maintenance of stainless steel equipment for batch manufacturing of vaccines is discussed. After each batch process, the manufacturing equipment, which includes vessels and transfer lines, is cleaned using water and detergents. Every ten batch processes, the equipment is preventively treated using a reductive solution according to example 1. After treatment with the reductive solution, the equipment's vessels and transfer lines are rinsed using water.

The invention claimed is:

1. A reductive solution for preventing rouge formation on surfaces of stainless steel, said solution comprising:
   from $5.0 \times 10^{-3}$ to $5.0 \times 10^{-2}$ mol/l of oxalate;
   from $1.35 \times 10^{-5}$ to $9.0 \times 10^{-5}$ mol/l of $Fe^{2+}$; and,
   wherein the reductive solution has a pH value from 2.0 to 4.0.

2. The reductive solution of claim 1, wherein the solution has a pH value from 2.8 to 3.2.

3. The reductive solution of claim 1, wherein the solution further comprises one or more pH modifiers.

4. The reductive solution of claim 3, wherein the one or more pH modifiers are selected from the group consisting of $NH_3$ and $NH_4OH$.

5. The reductive solution of claim 1, wherein the solution does not comprise citric acid.

6. A method for manufacturing a reductive solution of claim 1, comprising the step of:
   mixing water, oxalic acid and/or salts thereof, a water-soluble ferrous salt.

7. The method of claim 6, wherein the method further comprises mixing one or more pH modifiers.

8. A process for preventing rouge formation on surfaces of stainless steel substrates, comprising the step of: contacting the stainless steel substrate with a reductive solution of claim 1.

9. The process of claim 8, wherein the reductive solution and/or the substrate has a temperature of 50 to 95° C. during contacting.

10. The process of claim 8, wherein the reductive solution and/or the substrate has a temperature of 80 to 90° C. during contacting.

11. The process of claim 8, wherein the contact time of the substrate with the reductive solution is from 0.50 hours to 8 hours.

12. The process of claim 8, wherein the contact time of the substrate with the reductive solution is from 0.75 hours to 1.5 hours.

13. The process of claim 8, comprising the step of contacting the stainless steel substrate with the reductive solution on a recurring basis; the frequency of contacting being between one contacting step per process cycle and one contacting step every 20 process cycles.

14. The process of claim 8, comprising the step of contacting the stainless steel substrate with the reductive solution on a recurring basis; the frequency of contacting being between one contacting step every 5 process cycle and one contacting step every 10 process cycles.

15. The process of claim 8 wherein, in between successive contacting events, the stainless steel substrate is exposed to an aqueous fluid having a conductivity less than 1 μS/cm².

16. The process of claim 8 wherein the step of contacting is performed by dipping, flushing, or spraying.

* * * * *